United States Patent
Wang

(10) Patent No.: US 7,019,913 B1
(45) Date of Patent: Mar. 28, 2006

(54) ZOOM LENS BARREL

(75) Inventor: Hui-Man Wang, Chung Ho (TW)

(73) Assignee: Nucam Corporation, Taipei (TW)

( * ) Notice: Subject to any disclaimer, the term of this patent is extended or adjusted under 35 U.S.C. 154(b) by 0 days.

(21) Appl. No.: 11/072,282

(22) Filed: Mar. 7, 2005

(51) Int. Cl.
*G02B 15/14* (2006.01)

(52) U.S. Cl. ........................ 359/694; 359/703; 359/704

(58) Field of Classification Search ................ 359/694, 359/703, 704, 823
See application file for complete search history.

(56) References Cited

U.S. PATENT DOCUMENTS

| | | | | |
|---|---|---|---|---|
| 5,739,963 A | * | 4/1998 | Kato | 359/704 |
| 5,900,995 A | * | 5/1999 | Akada et al. | 359/824 |
| 2005/0094992 A1 | * | 5/2005 | Hamasaki et al. | 396/144 |
| 2005/0115358 A1 | * | 6/2005 | Hamasaki et al. | 74/640 |

\* cited by examiner

*Primary Examiner*—Ricky L. Mack
(74) *Attorney, Agent, or Firm*—Rosenberg, Klein & Lee

(57) ABSTRACT

A zoom lens barrel includes a first stationary cylinder defining an optical axis. The first stationary cylinder has a tubular wall surrounding a passage. A guiding and positioning slot is defined in the tubular wall along the optical axis with a plurality of anchor points and block points alternately arranged on edges thereof. A first lens carrier is held in the passage and has a driving pole. A second lens carrier surrounds the tubular wall and has a retainer and a first guiding slot. A second stationary cylinder surrounds the second lens carrier and has a stopper and a second guiding slot. The driving pole passes through the guiding and positioning slot, the first and the second guiding slot and is positioned in one of the anchor points. The spring is retained between the first stationary cylinder and the second lens carrier to push the second lens carrier moving with the first lens carrier till the retainer is blocked by the stopper.

8 Claims, 7 Drawing Sheets

ZOOM LENS BARREL

FIELD OF THE INVENTION

The present invention generally relates to a zoom lens barrel, more particularly to a zoom lens barrel suitable for portable electronic equipments.

THE RELATED ART

In recent years, portable electronic equipments with photographic function, such as simple cameras, mobile phones and PDAs, have been more and more popular. These portable electronic equipments have become so small that they require zoom lens barrels to be configured therein be preferable to have a small size and simple structure as much as possible.

U.S. Pat. No. 6,369,956 issued on Apr. 9, 2002 discloses a zoom lens barrel which has a plurality of linear movement cylinders and rotary feed cylinders. These linear movement cylinders and rotary feed cylinders mate mutually to move two lens groups along an optical axis. This design makes the zoom lens barrel complex, bulky, costly, and troublesome to assemble. U.S. Pat. No. 6,741,400 issued on May 25, 2004 discloses another zoom lens barrel which has a cam cylinder and two lens carriers. By rotating one of lens carriers, the lens carriers are moved along the optical axis. In order to guild the lens carriers moving along the optical axis, two set of cam tracks are formed extending away from the wall of the cam cylinder in a radial direction and extending along and about the optical axis. Such zoom lens barrel is still complicated in structure and large in size.

SUMMARY OF THE INVENTION

An object of the present invention is to provide a zoom lens barrel which is simple in structure, small in size, and easy to assemble.

To achieve the above object, the present invention provides a zoom lens barrel including a first stationary cylinder defining an optical axis, a first lens carrier, a spring, a second lens carrier and a second stationary cylinder.: The first stationary cylinder is provided with a guiding cylinder which has a tubular wall surrounding a passage. A guiding and positioning slot extending along the optical axis is defined in the tubular wall with a plurality of anchor points and block points alternately arranged on edges thereof. The first lens carrier, which is held in the passage and is aligned with the optical axis, has a driving pole passing through the guiding and positioning slot and being positioned in one of the anchor points, and positions of the first lens carrier is changed by moving the driving pole in the guiding and positioning slot from one of the anchor points to another. The second lens carrier, which surrounds the guiding cylinder and is aligned with the optical axis, has a retainer and a first guiding slot for the driving pole passing through. The second stationary cylinder, which surrounds the second lens carrier, has a stopper and a second guiding slot extending along the optical axis for the driving pole passing through. The spring is retained between the first stationary cylinder and the second lens carrier, which tends to push the second lens carrier toward a farthest point where the retainer of the second lens carrier engages with the stopper of the second stationary cylinder. The return of the second lens carrier is driven by the driving pole, which simultaneously compresses the spring.

According to the mentioned above, by driving the driving pole of the first lens carrier along the guiding and positioning slot, the zoom lens barrel is shift between a contraction state and a zooming state, therefore the handling of the zoom lens barrel is easy. Moreover, the zoom lens barrel has a small number of simple parts, so the zoom lens barrel is simple in structure, small in size, and easy to assemble, which is suitable for portable electronic equipments.

BRIEF DESCRIPTION OF THE DRAWINGS

The present invention will be apparent to those skilled in the art by reading the following description of embodiments thereof, with reference to the attached drawings, in which.

DETAILED DESCRIPTION OF THE PREFERRED EMBODIMENTS

Figure 1:
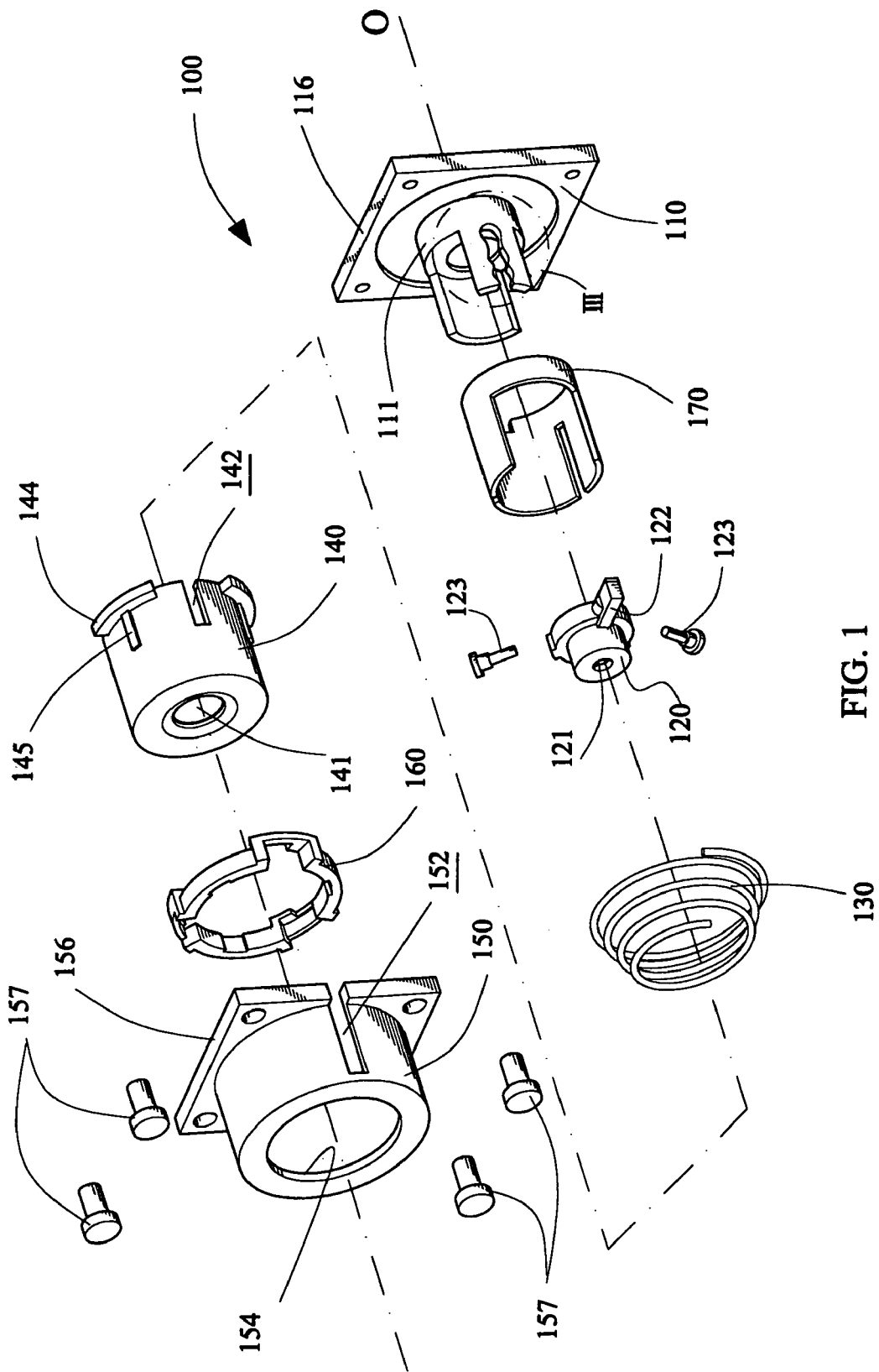
FIG. 1 is an exploded, perspective view of an embodiment of a zoom lens barrel according to the present invention.
Figure 2:
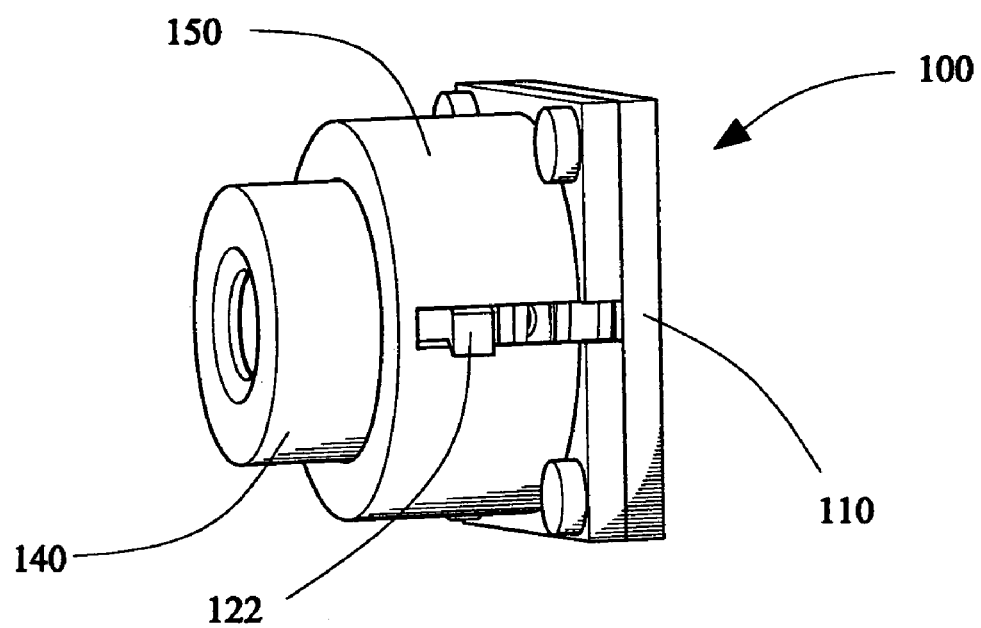
FIG. 2 is an assembled, perspective view of the zoom lens barrel of FIG. 1.

With reference to FIG. 1 and FIG. 2, an embodiment of a zoom lens barrel 100 according to the present invention is shown. The zoom lens barrel 100 includes a first stationary cylinder 110, a first lens carrier 120, a spring 130, a second lens carrier 140 and a second stationary cylinder 150. The first stationary cylinder 110 defines an optical axis O. The first lens carrier 120, the second lens carrier 140 and the second stationary cylinder 150 are coaxial or aligned with the optical axis O.

Figure 3:
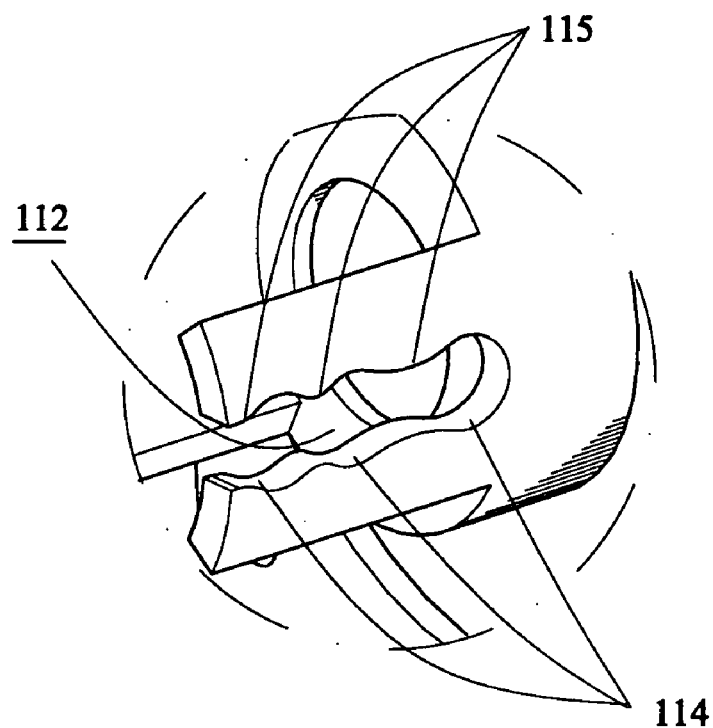
FIG. 3 is an enlarged view of the portion III of FIG. 1.
Figure 4:
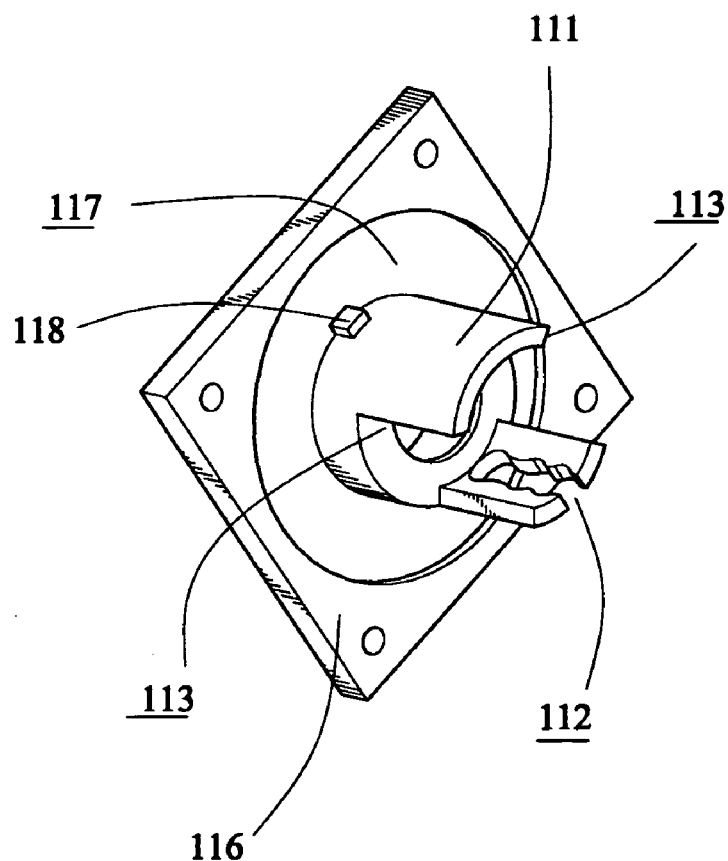
FIG. 4 is a perspective view of the first stationary cylinder of the zoom lens barrel shown in FIG. 1.

With reference to FIG. 3 and FIG. 4 together, the first stationary cylinder 110 has a guiding cylinder 111 in which a lens unit (not signed in the drawings) is secured. The guiding cylinder 111 has a tubular wall which surrounds a passage for holding the first lens carrier 120. A guiding and positioning slot 112 and two first sliding slots 113 are defined in the tubular wall along the optical axis O. Opposite edges of the guiding and positioning slot 112 are shaped in wave to alternately define wider portions and narrower portions in the slot 112. The widest points of the slot 112 are anchor points 114, and the narrowest points of the slot 112 are block points 115. In the present embodiment, three anchor points 114, namely the first anchor point, the second anchor point and the third anchor point, are provided.

Furthermore, the first stationary cylinder 110 has a first mount 116 which is extended outward from the rear end of the guiding cylinder 111 in the radial direction. The first mount 116 is used to be fixed in portable electronic equipment. A groove 117 around the guiding cylinder 111 is defined in the first mount 116 for holding the spring 130 to shorten the length of the zoom lens barrel 100 in the contraction state.

The first lens carrier 120 has a lens unit 121 and a driving pole 122 extended outward therefrom. The driving pole 122 passes through the guiding and positioning slot 112 and can overcome resistance of the block point 115 of the guiding cylinder 111 to move between the anchor points 114. Besides, in order to improve the stability of the first lens carrier 120 sliding between the anchor points 114, two followers 123 are provided which are secured in the first lens carrier 120 and pass through the first sliding slots 113.

The spring 130 is a tension spring of which one end is retained in the groove 117 of the first mount 116, and the other end leans against the second lens carrier 140. In the present embodiment, the spring 130 is to be set in the compression state or in recovering state to dispose the second lens carrier 140 in a corresponding position as will be described in greater detail hereinafter.

The second lens carrier 140 surrounds the surface of the first stationary cylinder 110 and is movable along the optical axis O. A lens unit 141 is held at the front end of the second lens carrier 140. A flange 144 is extended outward from the rear end of the second lens carrier 140 to lean against the spring 130. A retainer 145 is formed in the outer surface of the second lens carrier 140. In the present invention, the retainer 145 is formed by at least one rib which is extended from the flange 144 along the optical axis O. Besides, a first guiding slot 142 and two second sliding slots (not shown in drawings) are defined in the second lens carrier 140 for the driving pole 122 and two followers 123 passing through respectively, and also provide spaces for the driving pole 122 and two followers 123 sliding therein.

The second stationary cylinder 150 has a tubular wall which surrounds the second lens carrier 140. A second guiding slot 152 is provided on the tubular wall along the optical axis O for the driving pole 122 of the first lens carrier 120 passing through, and a stopper 154 shaped in a shoulder is extended inward from the front end of the tubular wall in the radial direction. The stopper is used to engage with the retainer 145 of the second lens carrier 140 to prevent the second lens carrier 140 from moving forward further. Furthermore, a second mount 156 is extended outward from the rear end of the second stationary cylinder 150 in the radial direction, which is fixed on the first mount 116 by screws 157.

Figure 5:
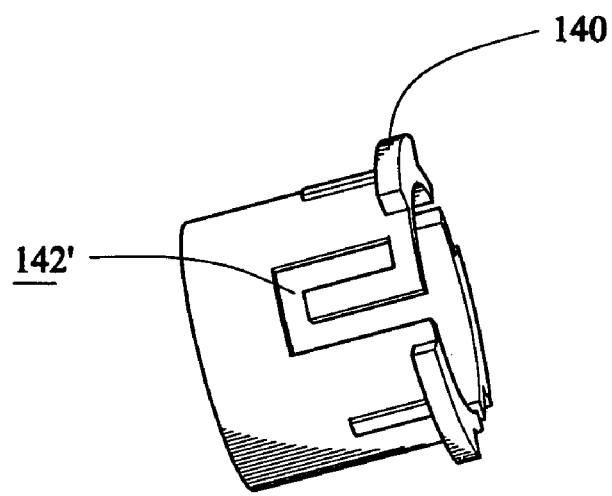
FIG. 5 is a perspective view of a modification of the second lens carrier of the zoom lens barrel shown in FIG. 1.
Figure 6:
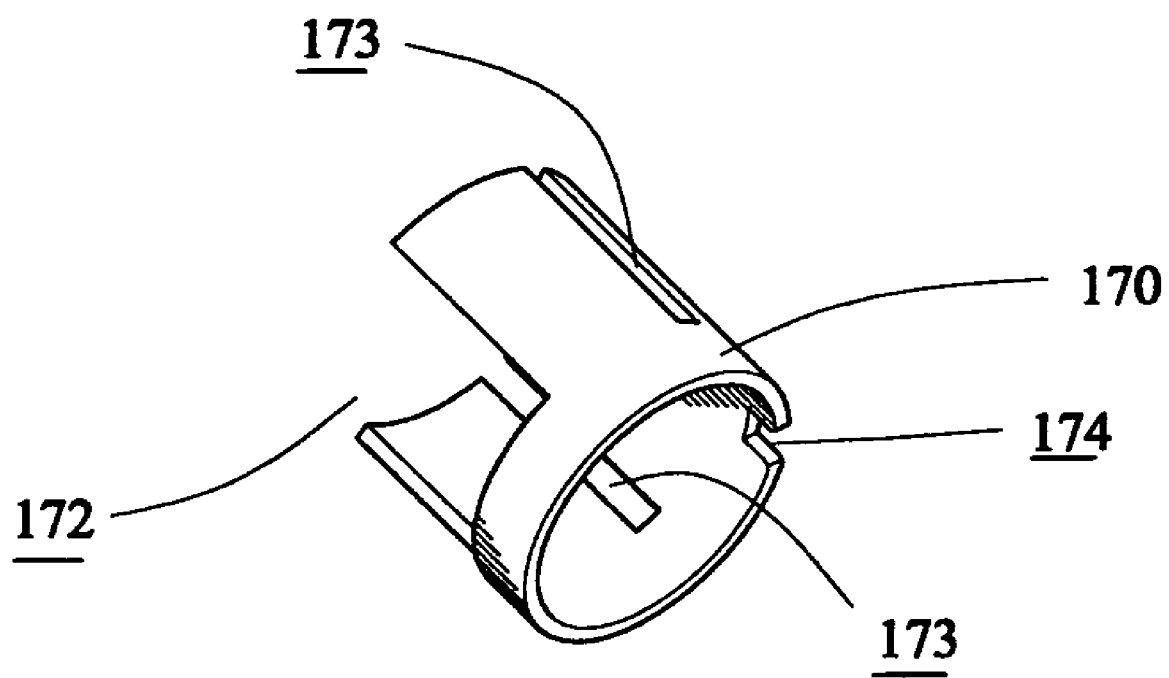
FIG. 6 is a perspective view of the metal guiding cylinder of the zoom lens barrel shown in FIG. 1.

In order to make the zoom lens barrel 100 return in the contraction state, the zoom lens barrel 100 further includes a holding ring 160 which surrounds the second lens carrier 140 and is located between the flange 144 of the second lens carrier 140 and the driving pole 122, therefore, the return of the driving pole 122 from the second or the third anchor point to the first anchor point drives the holding ring 160 together with the second lens carrier 140 move toward its initial contraction state, and the return of the second lens carrier 140 compress the spring 130. The function of the holding ring 160 can also be achieved by a specially designed structure of the first guiding slot of the second lens carrier 140. In FIG. 5, a modification of the second lens carrier 140 is shown, and the first guiding slot 142' is formed by two slots which extend along the optical axis O and communicate with each other, wherein one of the slots is exposed to the end edge of the second lens carrier 140, and the other slot spaces the end edge of the second lens carrier a certain distance. By the first guiding slot 142', the driving pole 122 can also push the second lens carrier 140 to compress the spring 130, therefore, the holding ring 160 can be omitted.

Because the first stationary cylinder 110 is made of resin material, the friction between the first sliding slot 113 and the follower 123 is relatively large, which is detrimental to the smooth slide of the follower 123. In order to overcome the above shortcoming, the zoom lens barrel 100 is further provided with a metal guiding cylinder 170 which surrounds the guiding cylinder 111 of the first stationary cylinder 110. The metal guiding cylinder 170 has a relatively wider notch 172 and two relatively narrower third sliding slots 173. The notch 172 is provided for the driving pole 122 of the second lens carrier 120 passing through, and the third sliding slots 173 is used to guide the followers 123 which do not contact with the first sliding slot 113 of the first stationary cylinder 110 any more, therefore the above shortcoming is overcome. Besides, a fixing groove 174 is defined at one end of the metal guiding cylinder 170, and a fixing block 118 is correspondingly provided on the guiding cylinder 111 of the first stationary cylinder 110 to mate with the fixing groove 174 to secure the metal guiding cylinder 170 on the first stationary cylinder 110.

With reference FIG. 7 to FIG. 12, a zooming process of the zoom lens barrel 100 is described in the following.

Figure 7:
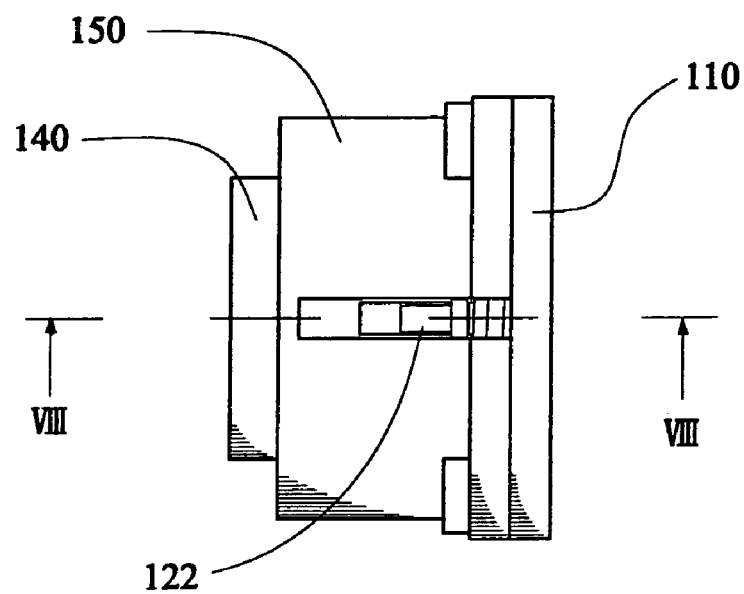
FIG. 7 is a side elevational view of the zoom lens barrel in a position where the driving pole of the first lens carrier is in its first anchor point.
Figure 8:
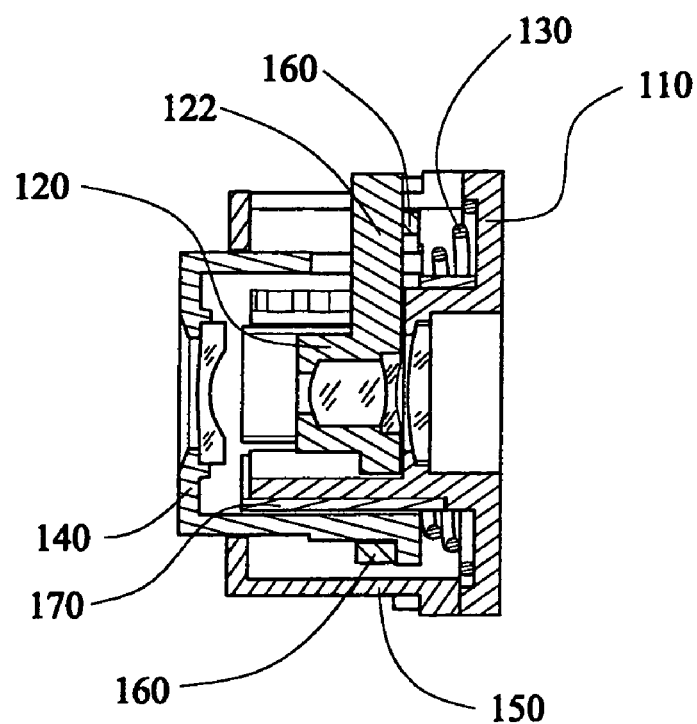
FIG. 8 is a cross-sectional view of the zoom lens barrel taken along line VIII—VIII of FIG. 7.
Figure 9:
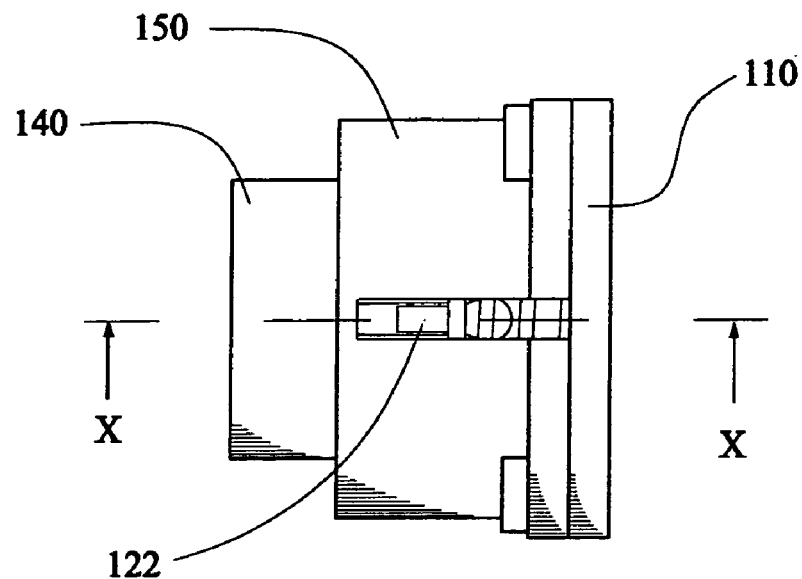
FIG. 9 is a side elevational view of the zoom lens barrel in a position where the driving pole of the first lens carrier is in its second anchor point.
Figure 10:
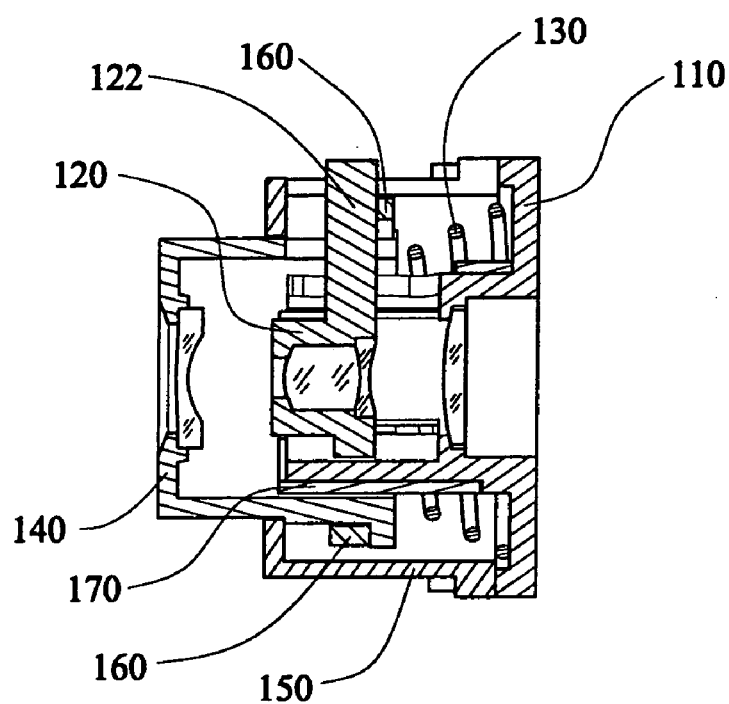
FIG. 10 is a cross-sectional view of the zoom lens barrel taken along line X—X of FIG. 9.
Figure 11:
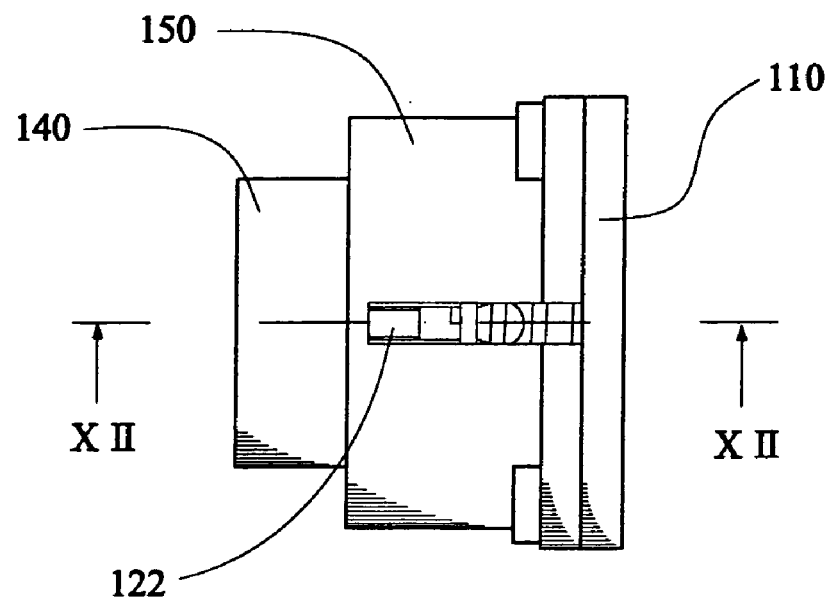
FIG. 11 is a side elevational view of the zoom lens barrel in a position where the driving pole of the first lens carrier is in its third anchor point.
Figure 12:
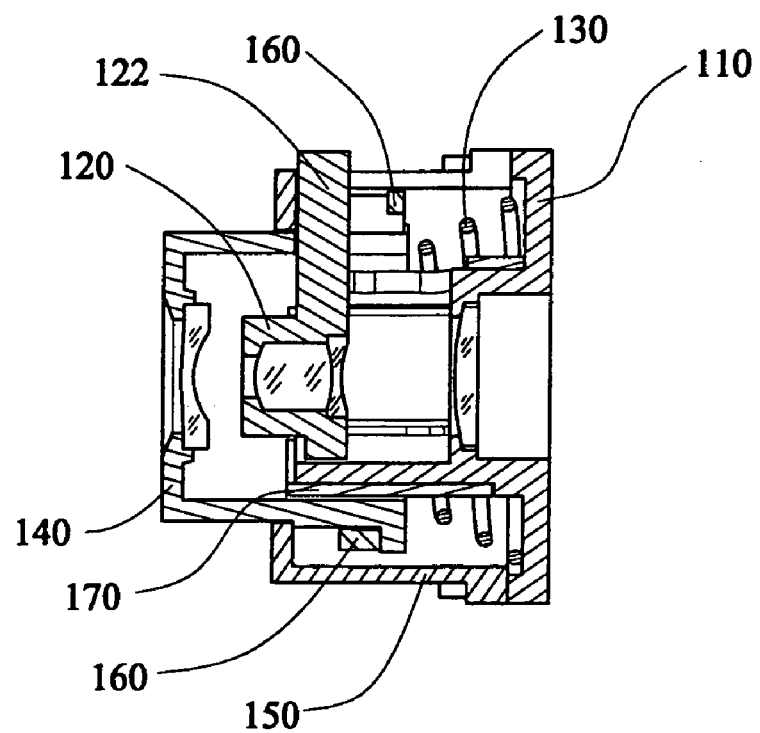
FIG. 12 is a cross-sectional view of the zoom lens barrel taken along line XII—XII of FIG. 11.

FIG. 7 and FIG. 8 show the contraction state of the zoom lens barrel 100. The driving pole 122 of the first lens carrier 120 is set in the first anchor point, and the spring 130 is set in compression state, therefore, the length of the zoom lens barrel 100 is shortest. When the driving pole 122 is pushed along the guiding and positioning slot 112 and set in the second anchor point, the spring 130 recovers elastically and pushes the second lens carrier 140 moving forward till the retainer 145 of the second lens carrier 140 is blocked by the stopper 154 of the second stationary cylinder 150, in which the zoom lens barrel 100 is set in the zooming state, as shown in FIG. 9 and FIG. 10. When the driving pole 122 of the first lens carrier 120 is moved to the third anchor point, as shown in FIG. 11 and FIG. 12, to vary the focal length of the zoom lens barrel 100, because the retainer 145 of the second lens carrier 140 has been blocked by the stopper 154 of the second stationary cylinder 150, the second lens carrier 140 can not move forward along with the driving pole 122, that is to say, the length of the lens barrel 100 is not increased, and the stopper determines the farthest point of the second lens carrier 140. When to return the zoom lens barrel 100 from the zooming state to the contraction state, the driving pole 122 of the first lens carrier 120 is moved to the first anchor point from the second anchor point. In the above moving course of the driving pole 122, the driving pole 122 pushes the holding ring 160 toward the first mount 166 of the first stationary cylinder 110, and the holding ring 160 pushes the second lens carrier 140 which, in turn, compress the spring 130. When the spring 130 is compressed in the compression state, the zoom lens barrel 100 is in the contraction state.

What is claimed is:

1. A zoom lens barrel, comprising:
   a first stationary cylinder defining an optical axis, said first stationary cylinder having a guiding cylinder which has a tubular wall surrounding a passage, a guiding and positioning slot being defined in the tubular wall extending along the optical axis, the guiding and positioning slot having a plurality of anchor points and block points alternately arranged on edges thereof;

a first lens carrier held in said passage and aligned with said optical axis, said first lens carrier having a driving pole which passes through the guiding and positioning slot and is positioned in one of said anchor points, positions of said first lens carrier being changed by moving the driving pole in the guiding and positioning slot from one of said anchor points to another;

a second lens carrier surrounding the guiding cylinder and aligned with said optical axis, said second lens carrier having a retainer and a first guiding slot for the driving pole passing through;

a spring, one end of the spring leaning against the first stationary cylinder, the other end leaning against the second lens carrier; and a second stationary cylinder surrounding the second lens carrier, said second stationary cylinder having a stopper and a second guiding slot extending along said optical axis for the driving pole passing through;

wherein the spring tends to push the second lens carrier toward a farthest point where the retainer of the second lens carrier engages with the stopper of the second stationary cylinder, and the return of the second lens carrier is driven by the driving pole, which simultaneously compresses the spring.

2. The zoom lens barrel as claimed in claim 1, wherein said first stationary cylinder further has a first mount which is extended outward from the rear end of the guiding cylinder in the radial direction, the first mount defines a groove around the guiding cylinder, and the end of the spring that leans against the first stationary cylinder is retained in the groove.

3. The zoom lens barrel as claimed in claim 2, wherein said second stationary cylinder further has a second mount which is extended outward from the rear end thereof in the radial direction, and the second mount is fixed on the first mount of the first stationary cylinder.

4. The zoom lens barrel as claimed in claim 1, wherein said first guiding slot is formed by two slots which extend along the optical axis and communicate with each other, one of the slots is exposed to the end edge of the second lens carrier, and the other slot spaces the end edge of the second lens carrier a certain distance.

5. The zoom lens barrel as claimed in claim 1, wherein said retainer of the second lens carrier is formed by at least one rib extending along the optical axis.

6. The zoom lens barrel as claimed in claim 1, wherein said first lens carrier further has at least one follower, said guiding cylinder defines a first sliding slot for the follower passing through, and said second carrier defines a second sliding slot for the follower passing through.

7. The zoom lens barrel as claimed in claim 6, further comprising a metal guiding cylinder surrounding said guiding cylinder of the first stationary cylinder, said metal guiding cylinder defining a notch for the driving pole of the first lens carrier passing through and a third sliding slot for the follower passing through.

8. The zoom lens barrel as claimed in claim 1, further comprising a holding ring, said second lens carrier having a flange which is extended outward from the end thereof that leans against said spring, said holding ring surrounding the second lens carrier and being set between the flange and the driving pole of the first lens carrier.

* * * * *